United States Patent

Snyder

Patent Number: 5,816,847
Date of Patent: Oct. 6, 1998

[54] INSERT MOLDED BATTERY CONTACTS AND METHOD

[75] Inventor: Thomas D. Snyder, Raleigh, N.C.

[73] Assignee: Ericsson Inc., Research Triangle Park, N.C.

[21] Appl. No.: 713,508

[22] Filed: Sep. 13, 1996

[51] Int. Cl.$^6$ .................................................. H01R 3/00
[52] U.S. Cl. ........................................................... 439/500
[58] Field of Search .................................. 439/500, 736, 439/627, 620

[56] References Cited

U.S. PATENT DOCUMENTS

| | | | |
|---|---|---|---|
| 4,772,225 | 9/1988 | Ulery | 439/620 |
| 4,804,332 | 2/1989 | Pirc | 439/620 |
| 4,865,562 | 9/1989 | Burg et al. | 439/736 |
| 4,981,490 | 1/1991 | Machida | 429/4 |
| 5,096,788 | 3/1992 | Bresin | 429/99 |
| 5,509,813 | 4/1996 | Lu | 439/79 |

FOREIGN PATENT DOCUMENTS 0 571 236  11/1993  European Pat. Off. .

*Primary Examiner*—Gary F. Paumen
*Attorney, Agent, or Firm*—Nixon & Vanderhye PC

[57] ABSTRACT

A contact assembly provides a reliable contact between a battery pack and an electronic device. The assembly includes a plurality of contact members and an insulator molded to the contact members. The plurality of contact members preferably include a positive contact member and a negative contact member each having a weldable surface and a selectively plated surface. The weldable surfaces are welded to the positive and negative terminals of the battery pack, respectively. The selectively plated surfaces are preferably plated with gold to ensure a good connection between the device and the battery pack. The insulator serves to fix the contact members relative to each other. In addition, the insulator facilitates minimization of the battery pack size by enabling the contacts to be placed very close to each other.

23 Claims, 4 Drawing Sheets

INSERT MOLDED BATTERY CONTACTS AND METHOD

BACKGROUND OF THE INVENTION

The present invention relates generally to an electrical connection between a battery pack and an electronic device and, in particular, to an insert molded battery contact assembly including selectively plated surfaces for connection to an electronic device.

In designing a battery contact assembly for an electronic device such as a cellular phone or the like, it is a goal to provide contact in a minimum space with minimum cost, while at the same time being easily manufactured in high volume and of course meeting the mechanical and electrical requirements for functionality.

A battery-device connection typically has a solid contact element and a spring contact element. The spring element is usually the more expensive and space-consuming part, so in minimizing battery size, this half of the connection is often put in the device. Moreover, a significantly greater number of batteries are manufactured and purchased than the devices themselves, and it is considerably more cost effective to put the more expensive spring element in the device as opposed to including it with the battery pack. Typically, there is also a requirement for gold-plating the contact mating surfaces. Connection and plating is achieved in various ways, including coil and leaf spring elements, flat, rigid contact members, and direct contact to the ends of the cells.

Earlier contact solutions did not provide optimal designs to overcome the shortcomings noted above. In particular, the battery size was not conducive to spring contacts in the battery. Moreover, other solutions lacked insulation between the positive contact and the negative cell and vice versa or between the positive and negative contacts themselves, resulting in a short circuit risk. Applications exist where insulation is provided between contacts and cells, but these applications involve added assembly components, steps, complexity and cost.

SUMMARY OF THE INVENTION

It is therefore an object of the invention to provide a molded battery contact assembly and method that overcomes the drawbacks associated with the prior designs. It is another object to provide a battery contact assembly that helps to minimize battery pack size and cost while enabling the design to be efficiently manufactured.

In accordance with the present invention, a battery contact assembly is formed by insert-molding stamped contacts in a thin layer of plastic. Although is the plastic adds some thickness to the contact size, it does not add manufacturing steps including inserting a separate layer of insulation between the contacts and cells. In addition, insert-molding reduces positioning tolerances and allows contacts of different potential to be placed closer together. The design according to the invention helps to minimize not only the battery contacts themselves, but allows for a smaller mating contact design on the transceiver side, thus minimizing the entire battery-device contact interface.

In an electronic device designed for lithium cells, a third or further additional contact is added to the battery pack. Typically, it involves the addition of another contact in the same design, which does not require additional tooling of a new contact design. The present invention is easily configured to enable a NiCd battery pack to be used with a device that is designed for lithium cells. In order to add a third contact between the original two contacts, the contact spacing is held to a 0.5 mm maximum. With separate contacts, it is difficult and often impossible to place contacts with the tolerance tight enough to allow for 0.5 mm spacing. The only safe way to do this is to have an insulator between the contacts that cannot become misaligned during assembly or in ordinary use. Since the insulator according to the present invention is a part of the final contact assembly, the normal assembly tolerances associated with placement and attachment of a separate contact are removed, allowing for a smaller overall package with increased confidence of short circuit protection.

The plastic structure also allows for the close proximity placement of the positive contact above the negative cell without a short circuit risk. In the past, one of the geometrical issues that contacts were designed around was that a contact of one potential could not be located over a cell of another potential without an added insulator piece, which had to be placed and held very carefully and during the attachment of the contacts. This process is difficult and expensive. The insulator according to the present structure is an integral part of the contact assembly, thus removing complexity, placement tolerances and normal battery pack assembly considerations.

The plastic also provides support for the contact, which is advantageous for several reasons. First, it provides a firm backing for the fixed side of the battery-device connection. This allows for use of relatively soft metal contact materials, which are often less expensive, thinner and more easily weldable to the cells. The plastic also protects the metal contacts during shipping and during the assembly process, which potentially increases yield as there will be less damaged contacts that will have to be scrapped. The plastic could also be provided with additional locating functions such as conforming to the shape of battery cells to further aid in eliminating assembly complexity and tolerances and to accommodate automated assembly.

In an exemplary embodiment, the objects of the invention are achieved by providing a contact assembly including a plurality of contact members, and an insulator molded to the contact members that fixes the contact members relative to each other. The assembly includes a device side and a battery side, wherein the selectively plated surfaces are disposed on the device side, and the insulator is molded to the battery side. In this regard, the selectively plated surfaces define a device contact width wherein the insulator is disposed substantially across the device contact width.

The plurality of contact members may include a positive contact member and a negative contact member, each having a weldable surface and a selectively plated surface. The contact members each preferably include a stepped area at an intermediate portion thereof between the weldable surface and the selectively plated surface, respectively. The insulator is disposed substantially adjacent the selectively plated surfaces between the stepped areas. An inside end of the positive contact member is spaced from an inside end of the negative contact member by at most 0.5 mm. The positive contact member and the negative contact member are preferably formed of nickel and the selectively plated surfaces are preferably plated with gold.

A carrier may be provided formed integral with the positive and negative contact members. In this regard, the carrier includes score lines between the carrier and the contact members. Alternative fixture means may be provided for fixing the contact assembly for welding to a battery pack. For example, the fixture means may include a fixing groove formed in the insulator that is shaped to receive a fixing post for welding.

In another exemplary aspect of the invention, there is provided a method of manufacturing the contact assembly according to the invention. The method includes the steps of stamping the contact members from a sheet of weldable material, and molding the insulator about the contact members. The method may further include plating the contact members before the molding step.

In accordance with yet another exemplary aspect according to the invention, there is provided a contact assembly including a first contact embedded in an insulator, and a second contact embedded in the insulator and spaced from the first contact. The first and second contacts each have an exposed weldable surface and a selectively plated surface. The insulator defines a device contact area, wherein the selectively plated surfaces are disposed inside the device contact area, and the exposed weldable surfaces are disposed outside the device contact area.

In accordance with still another exemplary aspect of the invention, there is provided a battery pack for an electronic device including at least one cell having a positive contact terminal and a negative contact terminal for contacting corresponding positive and negative leads of the electronic device. The battery pack also includes a contact assembly including a plurality of contact members embedded in an insulator such that the insulator serves to fix the contact members relative to each other. One of the contact members is secured, preferably by welding, to the positive contact terminal and includes a surface for contacting the positive lead. Another of the contact members is secured, preferably also by welding, to the negative contact terminal and includes a surface for contacting the negative lead. The contact member of one potential may extend over the contact terminal of opposite potential of the at least one cell.

BRIEF DESCRIPTION OF THE DRAWINGS

These and other aspects and advantages of the present invention will be described in detail with reference to the accompanying drawings, in which.

DETAILED DESCRIPTION OF PREFERRED EMBODIMENTS

Figure 1:
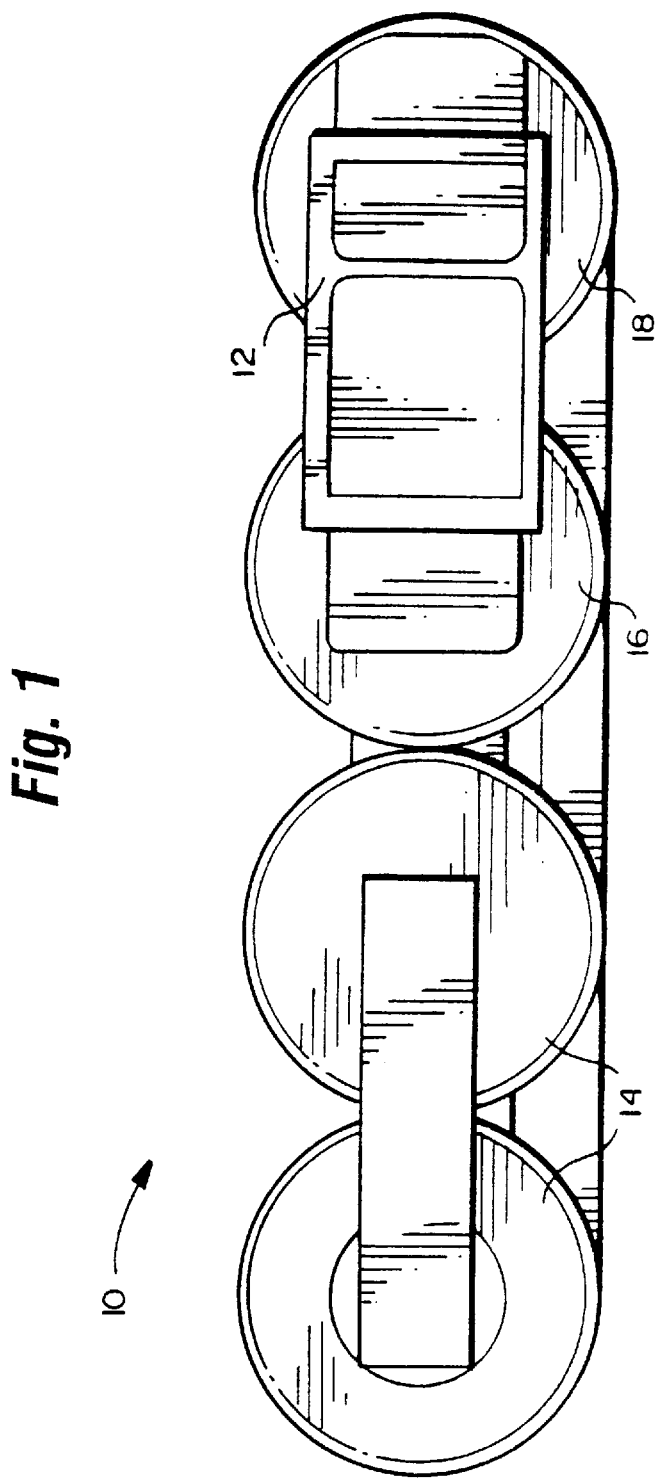
FIG. 1 is a plan view of a battery pack including the molded battery contact assembly according to the invention attached thereto.

FIG. 1 illustrates a battery pack 10 incorporating the molded battery contact assembly 12 according to the invention. Typically, the battery pack 10 includes a plurality of cells 14 that are arranged such that the positive terminal of one cell is disposed adjacent the negative terminal of an adjacent cell. The cells 14 are connected in series, with the last two cells 16, 18 having exposed terminals including a positive contact terminal and a negative contact terminal that contact leads of an electronic device (not shown) that is powered by the battery pack. To ensure a good connection between the battery pack and the electronic device and to accommodate geometrical constraints, the contact assembly 12 according to the present invention is welded to the exposed terminals 16, 18 of the battery pack 10.

Figure 2:
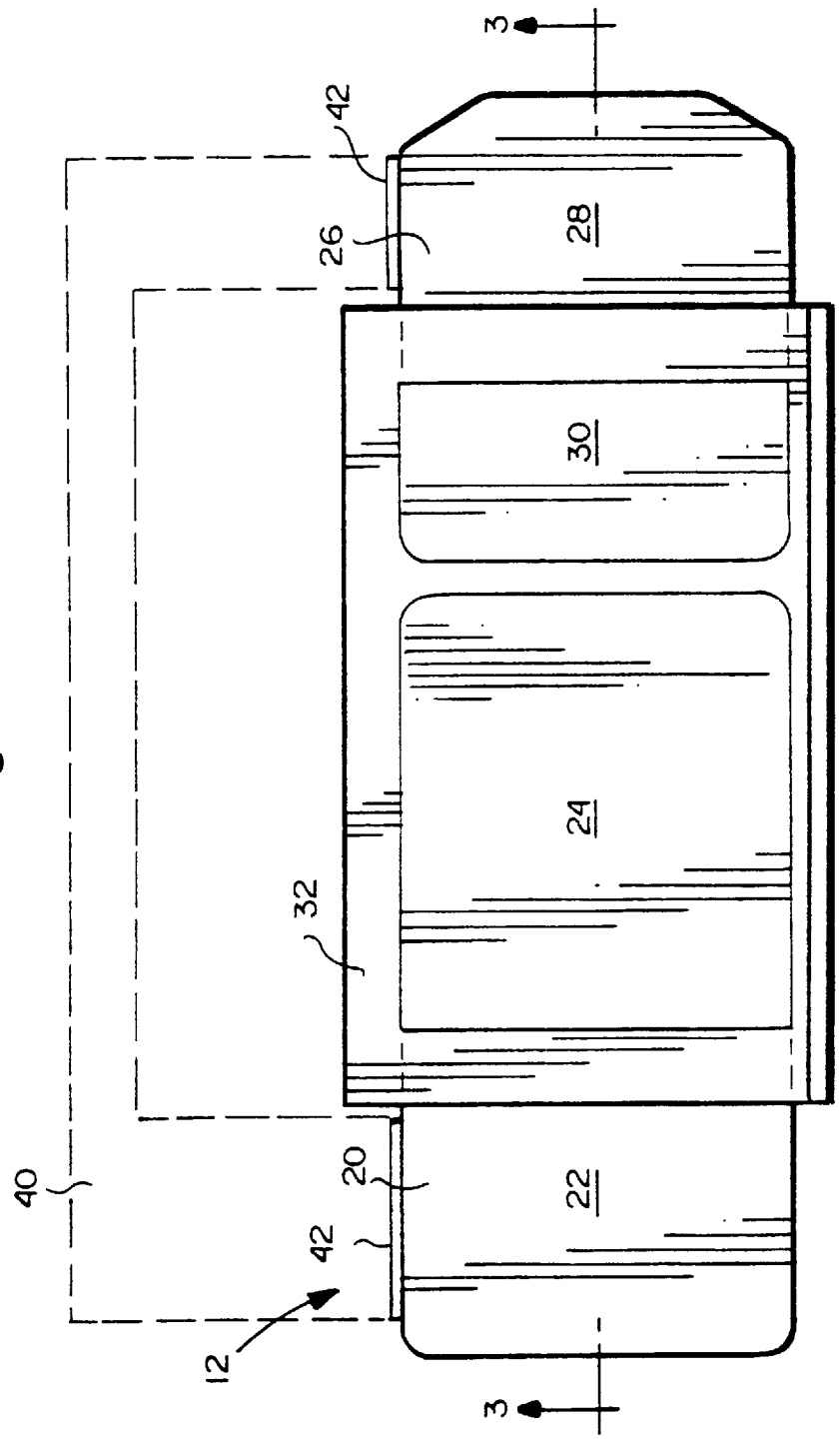
FIG. 2 is a plan view of the battery contact assembly according to the invention.

Referring to FIG. 2, the contact assembly 12 according to the present invention includes a positive contact member 20 having a weldable surface 22 and a selectively plated surface 24 and a negative contact member 26 also having a weldable surface 28 and a selectively plated surface 30. An insulator 32 such as plastic is molded to the positive contact member 20 and the negative contact member 26 and fixes the contact members relative to each other such that the contact members 20, 26 are embedded in the insulator 32. The contact members 20, 26 are preferably formed of nickel, and the selectively plated surfaces 24, 30 are preferably plated with gold to provide a good conducting surface for the electronic device leads.

Figure 3:
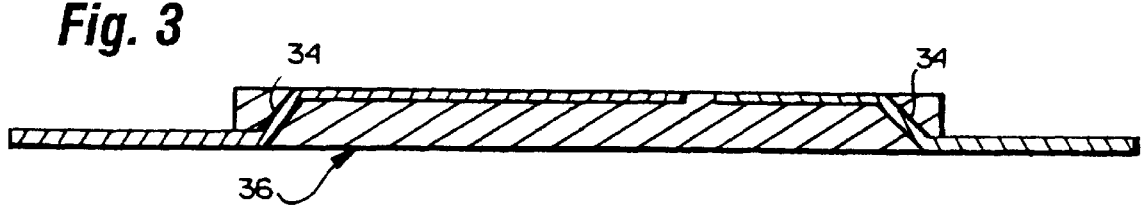
FIG. 3 is a cross-sectional view along line III—III in FIG. 2.

As shown in FIG. 3, each of the contact members includes a step 34 at an intermediate portion thereof, which is disposed between the weldable surfaces 22, 28 and the selectively plated surfaces 24, 30, respectively. The steps 34 define a channel 36, which defines an area for receiving the insulator 32.

Referring again to FIG. 2, the contact members 20, 26 are held by the insulator 32 spaced from each other by a predetermined amount sufficient to prevent a short circuit risk. In a preferred arrangement, the predetermined amount is a maximum of 0.5 mm.

Figure 4:
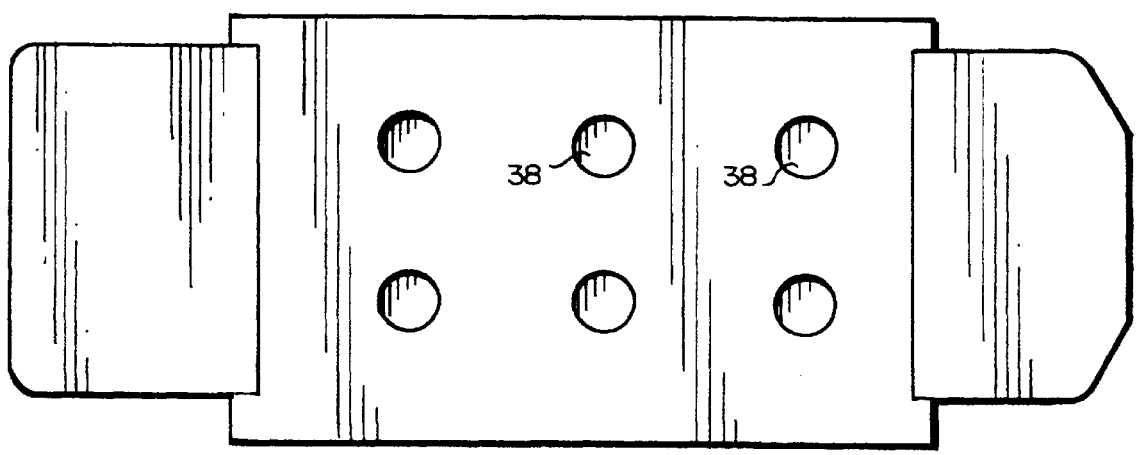
FIG. 4 is a bottom view of the battery contact assembly shown in FIG. 2.

In manufacturing the battery contact assembly 12, the contact members are stamped from a flat piece of preferably nickel material. The selectively plated surfaces 24, 30 are plated preferably with gold in any known manner either before or after the contact members are stamped. The members are then mounted in a conventional molding apparatus, and securing pins are urged against the underside of the contact members to ensure that the selectively plated surfaces 24, 30 remain exposed after the molding process. That is, the securing pins urge the contact members against the molding cavity wall to prevent the mold from covering the selectively plated surfaces, and the selectively plated surfaces remain exposed. As shown in FIG. 4, these securing pins leave circular holes 38 in the insulator 32 after completion of the molding process. After the contact members are secured in the molding cavity, the molding material is injected into the molding cavity. The molded insulator thus defines a device contact area with the selectively plated surfaces being disposed inside the device contact area and the weldable surfaces being disposed outside the device contact area.

The resulting battery contact assembly includes the positive and negative contact members disposed spaced by the predetermined amount and having the selectively plated surfaces 24, 30 exposed on a device side of the contact assembly 12 with the insulator being molded to a battery side of the contact assembly 12. The selectively plated surfaces 24, 30 define a device contact width, and the insulator is disposed substantially across the device contact width. As shown in FIG. 3, a portion of the insulator 32 may be formed on the device side of the contact assembly 12 in the vicinity of the steps 34. Of course, alternative configurations of the contact members and the insulator would be suitable including more or less insulating material and/or other configurations of the contact members so long as the contact members are separated by a sufficient distance to prevent risk of short circuit and so long as sufficient insulation exists to prevent contact between the positive contact and the negative cell and vice versa. The invention is thus not meant to be limited to the arrangement that is illustrated and described.

The molded contact assembly is then positioned adjacent the contact terminals of the battery pack. The weldable surfaces 22, 28 of the contact members 20, 26 are attached preferably by welding to the contact terminals. A highly conductive and secure weld is obtained by virtue of the properties of the nickel material. Excellent conductivity between the battery pack and the electronic device is also obtained by virtue of the selectively plated surfaces 24, 30.

During welding of the contact assembly 12 to the battery pack 10, the contact assembly 12 must be properly positioned adjacent the positive and negative contact terminals. In one arrangement as shown in phantom in FIG. 2, the contact members 20, 26 are integrally stamped with a carrier 40. The contact assembly 12 is held in position over the battery pack 10 by securing the carrier 40. In similar regard, the carrier 40 can be used to secure the contact members during the molding process. After the weld is completed, the carrier 40 can be fatigued along score lines 42 and removed from the assembly.

Figure 5:
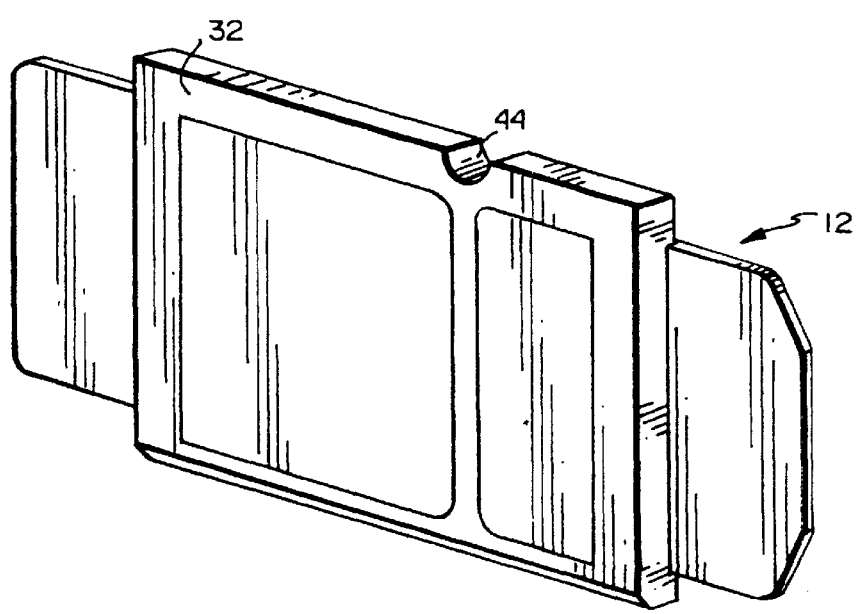
FIG. 5 is a perspective view of an alternative battery contact assembly according to the present invention.

In an alternative arrangement, referring to FIG. 5, the contact assembly 12 can be configured with a fixing groove 44 formed, for example, in the insulator 32. The fixing groove 44 is engageable with a fixing post at the welding station. Of course, those of ordinary skill in the art will contemplate other fixture means for fixing the contact assembly for welding to the battery pack. Examples include features for automated assembly robots to grab, plastic that is molded to fit securely around the cell geometry, or the like.

Figure 6:
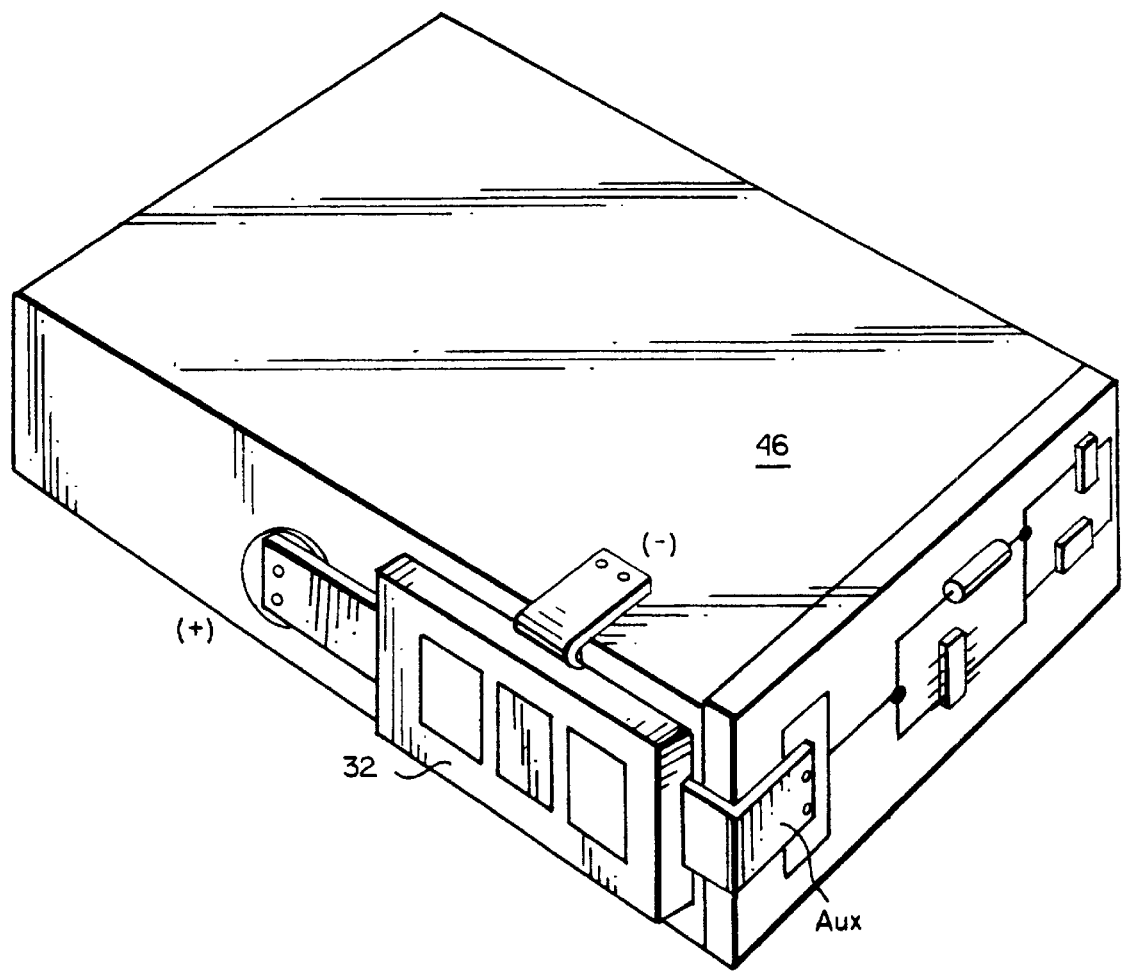
FIG. 6 is a perspective view of an alternative battery pack and contact assembly according to the invention.

Electronic devices such as cellular phones, for example, incorporating lithium cells may require three contacts, including a positive contact, a negative contact and an auxilliary contact for corresponding leads on the device. As shown in FIG. 6, a third contact can easily be incorporated with the concepts according to the present invention. The contact assembly in FIG. 6 is nonplanar to accommodate a prismatic cell 46. Those of ordinary skill in the art will contemplate other contact geometries with a plurality of contacts that fall within the spirit of the invention.

The battery contact assembly according to the present invention provides a reliable contact for a battery pack to an electronic device. The contact assembly helps to minimize battery pack size as well as manufacturing costs enabling high volume manufacture.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A contact assembly having a central region, the contact assembly further comprising:
    a plurality of contact members aligned longitudinally end to end, each of said contact members having a weldable surface, a selectively plated surface, and a stepped area between said weldable surface and said plated surface, wherein said stepped areas define the thickness of the contact assembly; and
    an insulator molded to said contact members at said central region such that distal ends of said contact members are exposed, said insulator fixing said contact members relative to each other.

2. A contact assembly according to claim 1, further comprising fixture means for fixing the contact assembly for welding to a battery pack.

3. A contact assembly according to claim 2, wherein said fixture means comprises a fixing groove formed in said insulator, said fixing groove being shaped to receive a fixing post for welding.

4. A contact assembly according to claim 1, wherein said plurality of contact members comprise a positive contact member and a negative contact member.

5. A contact assembly according to claim 4, wherein said selectively plated surfaces define a device contact width, said insulator being disposed substantially across said device contact width.

6. A contact assembly according to claim 4, comprising a device side and a battery side, said selectively plated surfaces being disposed on said device side, wherein said insulator is molded to said battery side.

7. A contact assembly according to claim 1, wherein said insulator is disposed substantially adjacent said selectively plated surfaces between said stepped areas.

8. A contact assembly according to claim 7, wherein said stepped area defines a thickness of the contact assembly.

9. A contact assembly according to claim 1, wherein said insulator is contained within said thickness.

10. A contact assembly according to claim 4, wherein an inside end of said positive contact member is spaced from an inside end of said negative contact member by at most 0.5 mm.

11. A contact assembly according to claim 4, wherein said positive contact member and said negative contact member are formed of nickel, and wherein said selectively plated surfaces are plated with gold.

12. A contact assembly according to claim 4, further comprising a carrier formed integral with said positive contact member and said negative contact member and including score lines between said carrier and said contact members.

13. A method of manufacturing a contact assembly including a plurality of contact members and an insulator molded to the contact members, the contact assembly having a central region, the method comprising:
    stamping the contact members from a sheet of weldable material and providing each of the contact members with a weldable surface, a selectively plated surface, and a stepped area between said weldable surface and said plated surface, wherein the stepped areas define the thickness of the contact assembly;
    aligning the contact members longitudinally end to end; and
    molding the insulator about the contact members at the central region such that distal ends of the contact areas are exposed.

14. A method according to claim 13, further comprising, before the molding step, the step of plating the contact members.

15. A contact assembly having a central region, the contact assembly comprising:
    a first contact embedded in an insulator; and
    a second contact embedded in said insulator and spaced from said first contact, said first and second contacts being aligned longitudinally end to end and each having an exposed weldable surface and a selectively plated surface, wherein said insulator is disposed in said central region such that distal ends of said contacts are exposed and wherein said first contact and said second contact each comprises a stepped area between said weldable surface and said plated surface, said stepped areas defining the thickness of the contact assembly.

16. A contact assembly according to claim 15, wherein said insulator defines a device contact area, said selectively plated surfaces being disposed inside said device contact area, and said exposed weldable surfaces being disposed outside said device contact area.

17. A contact assembly according to claim 15, wherein said first contact is spaced from said second contact by at most 0.5 mm.

18. A contact assembly according to claim 15, wherein said stepped areas of said first contact member and said second contact member are each disposed at an intermediate portion thereof between said exposed weldable surface and said selectively plated surface, respectively.

19. A contact assembly according to claim 15, wherein said first contact member and said second contact member are formed of nickel, and wherein said selectively plated surfaces are plated with gold.

20. A contact assembly according to claim 15, further comprising a carrier formed integral with said first contact member and said second contact member and including score lines between said carrier and said contact members.

21. A contact assembly according to claim 15, further comprising fixture means for fixing the contact assembly for welding to a battery pack.

22. A contact assembly according to claim 21, wherein said fixture means comprises a fixing groove formed in said insulator, said fixing groove being shaped to receive a fixing post for welding.

23. A contact assembly comprising:

a plurality of contact members; and an insulator molded to said contact members, said insulator fixing said contact members relative to each other, wherein said plurality of contact members comprise a positive contact member and a negative contact member each having a weldable surface and a selectively plated surface, said positive contact member and said negative contact member each comprising a stepped area at an intermediate portion thereof between said weldable surface and said selectively plated surface, respectively, defining a thickness of the contact assembly, and wherein said insulator is contained within said thickness.

* * * * *